Aug. 12, 1930.   T. E. FOULKE   1,772,603
CURRENT RECTIFIER AND VOLTAGE REGULATOR
Filed Dec. 17, 1926   4 Sheets-Sheet 1
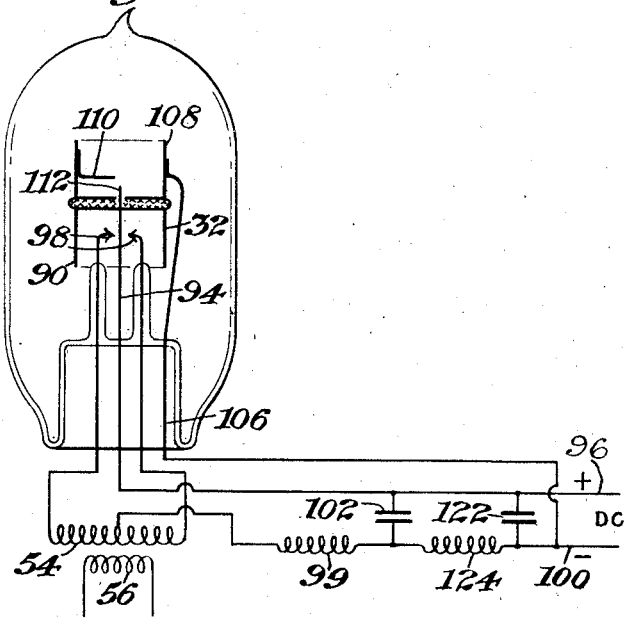
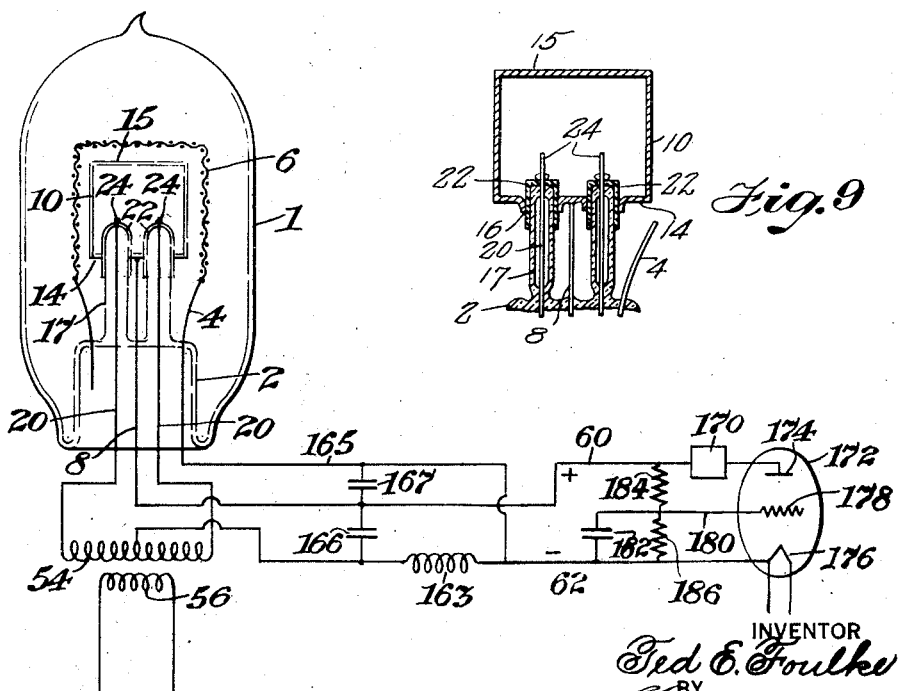
INVENTOR
Ted E. Foulke
BY
Thos. H. Brown
HIS ATTORNEY Aug. 12, 1930.   T. E. FOULKE   1,772,603
CURRENT RECTIFIER AND VOLTAGE REGULATOR
Filed Dec. 17, 1926   4 Sheets-Sheet 2
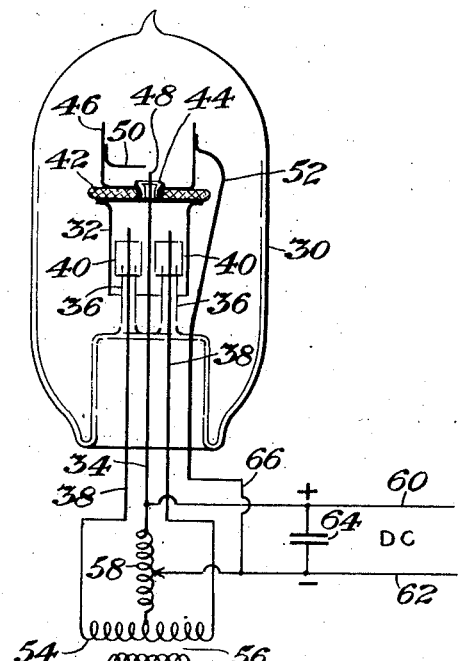
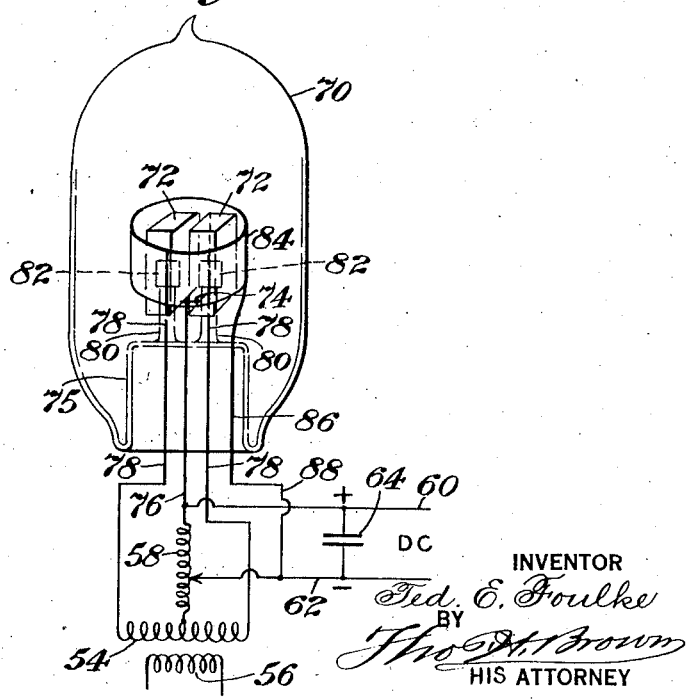
INVENTOR
Ted. E. Foulke
BY
HIS ATTORNEY

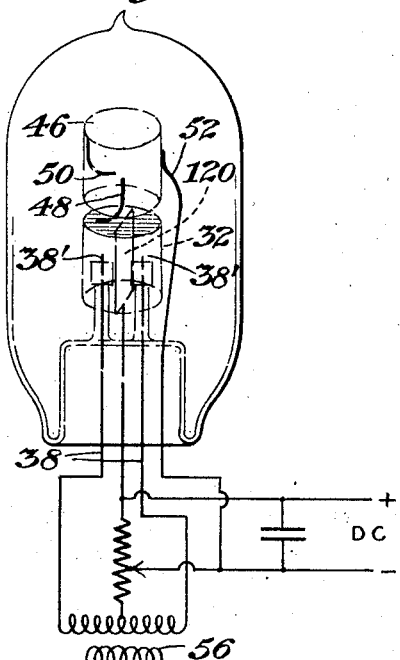
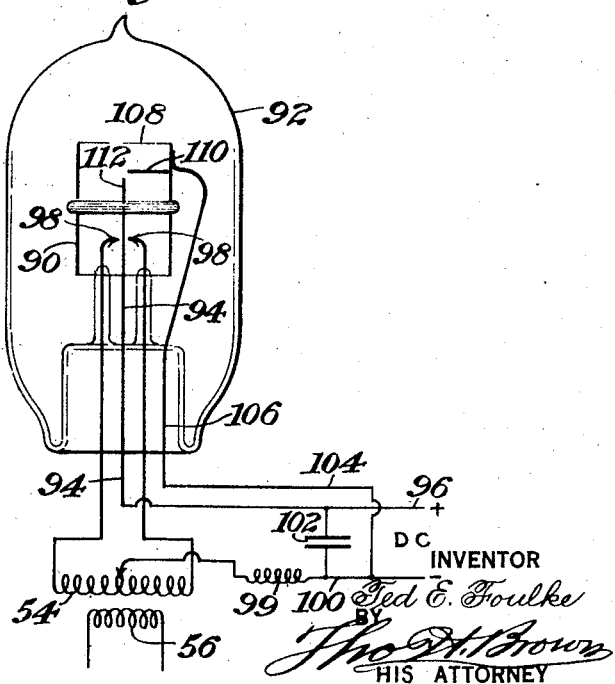

Aug. 12, 1930.  T. E. FOULKE  1,772,603
CURRENT RECTIFIER AND VOLTAGE REGULATOR
Filed Dec. 17, 1926  4 Sheets-Sheet 4
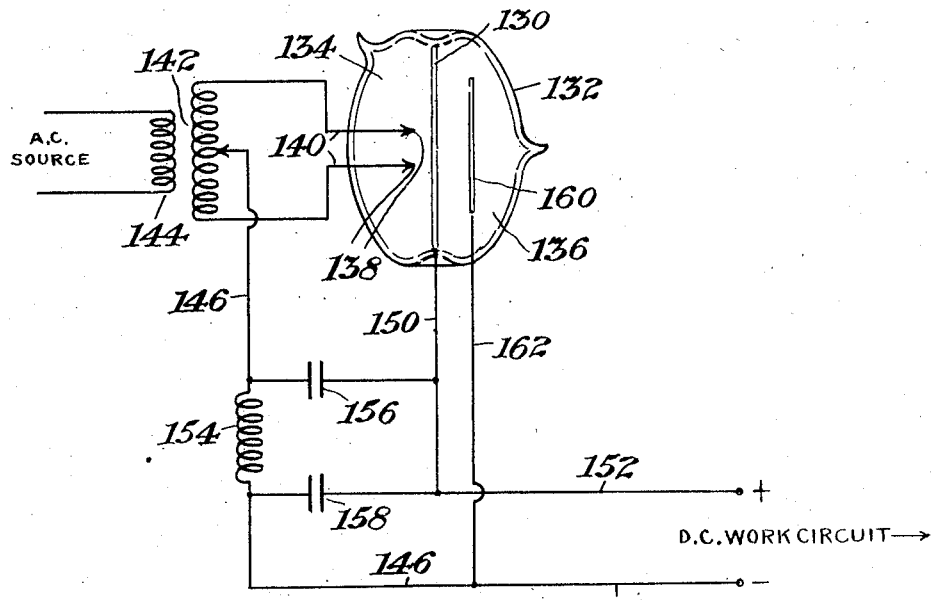
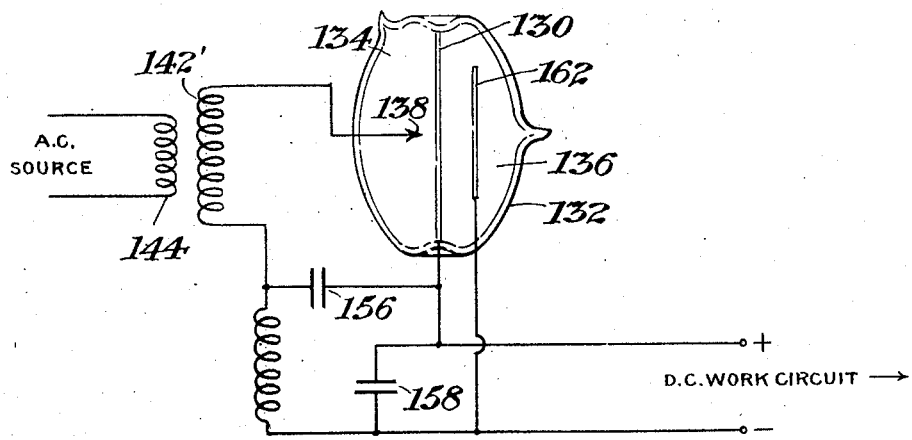
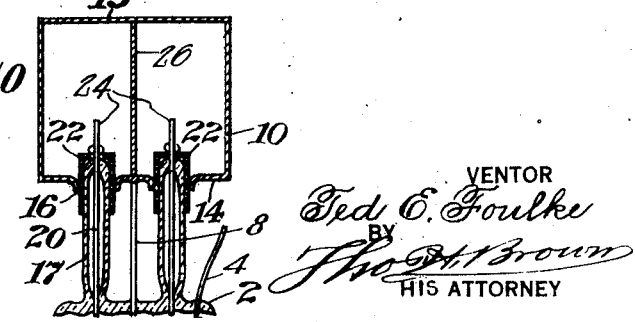

Patented Aug. 12, 1930

1,772,603

UNITED STATES PATENT OFFICE

TED E. FOULKE, OF NUTLEY, NEW JERSEY, ASSIGNOR TO GENERAL ELECTRIC VAPOR LAMP CO., OF HOBOKEN, NEW JERSEY, A CORPORATION OF NEW JERSEY

CURRENT RECTIFIER AND VOLTAGE REGULATOR

Application filed December 17, 1926. Serial No. 155,382.

My present invention relates to electrical devices for controlling the flow of electrical currents through influence of characteristics of the ionic conduction of currents between solid electrodes in gases or vapors. The invention relates more particularly to an ionic device for converting alternating currents into a rectified current and for regulating the voltage of the rectified current to maintain it within given and comparatively narrow limits. The invention also relates to systems of electrical distribution including a device of the kind above described and also relates to a new getter for use in and in combination with the electronic device of the present invention and in combination in gaseous conduction and space discharge conducting devices in general Various other objects and advantages of the invention will be obvious from the following particular description of forms of ionic devices and electrical circuits embodying the invention or from an inspection of the accompanying drawings; and the invention also consists in certain new and novel features of construction and combinations of parts hereinafter set forth and claimed.

In the accompanying drawings I have shown for purposes of illustration certain forms of devices and electrical circuits embodying the invention, in which Fig. 1 is a diagrammatic view in elevation of an embodiment of the ionic device of the invention, an electrical distribution system being shown connected thereto.

Figs. 2 to 6 are diagrammatic views in elevation of ionic devices embodying the invention with systems of electrical distribution connected thereto, Figs. 7 and 8 are diagrams of a system of electrical distribution including the element of the ionic devices of the invention, Fig. 9 illustrates details of construction of the device of Fig. 1, and Fig. 10 shows a modification of the structure shown in Fig. 9.

Like reference characters denote like parts in the several figures of the drawings.

According to the invention a single electrode element is used for two separate functions and forms a part of two different combinations of elements. One of these combinations has the function of rectifying an alternating current and the other combination has the function of regulating the voltage of the rectified current. In the first combination the element with the dual function serves as a cathode in a point to plate ionic rectifier and in the other combination this element serves as the anode in an electronic glow discharge type of voltage regulator. Between the plate and point of the rectifier combination there is provided a suitable atmosphere of gas or vapor such as mercury, argon, helium or neon and between the glow discharge voltage regulator elements there is also provided an atmosphere of a suitable gas or vapor. Preferably means are arranged for preventing gaseous conduction between the rectifier points and the voltage regulator anode, said means in some cases permitting of pressure equalization between the atmosphere in the two spaces. The atmosphere of the rectifier space and the atmosphere of the regulator space are composed of the same gases or vapors or mixtures thereof, and at the same or different pressures.

The preferred embodiment of the electronic device of the invention, however, is that illustrated in Figs. 1 and 9 of the drawing in which a sealed envelope 1 of glass or other suitable material has a re-entrant seal-in stem 2 through which is sealed into the envelope the lead 4 which supports and is electrically connected to the regulator cathode 6 which is in the form of a cylinder of metal wire gauze, of nickel, tungsten, iron or other suitable material. This glow discharge regulator cathode 6 being in the form of gauze and extending over a considerable surface as it does through being formed in the shape of a cylinder of appreciable diameter has two advantageous characteristics, namely, it represents a comparatively and sufficiently large glow discharge area and at the same time prevents over-heating and allows cooling of other electrode elements cooperating therewith. A second sealed-in lead-in 8 connects to and supports the electrode element 10 which is positioned concentrically within said electrode 6 and has its sides at a distance from said electrode 6 to suit a glow discharge function with a suitable atmosphere therebetween for voltage regulation purposes. Said cylindrical electrode 10 is preferably of metal such as nickel, iron, tungsten, or other suitable metal and is closed at the top and the bottom. Preferably the closure of said cylinder 10 is not hermetic or gas tight, in order to facilitate supplying gaseous atmosphere for the interior of said cylinder 10 and for the space between it and the exterior electrode 6 and therefore minute passageways or openings are provided through the wall of said closed cylinder 10 but said openings are of such minuteness to provide that ionic or gaseous conduction cannot take place therethrough between the interior and exterior of said cylinder 10. Such provision is suitably and economically made by spot welding the end members 14 and 15 to the ends of said cylinder 10 at different points thereabout to hold the side and ends close together and yet leaving minute passageways of the order of size above indicated. Said bottom member 14 has therethrough two openings 16 through which extend the seal-in stems 17 mounted onto said stem 2 and which are of glass tubing. From outside said envelope 1 there extend two lead-ins 20 each of which extends through said stem 2 where it is sealed-in, longitudinally through a respective stem 17 from the sides of which it is spaced apart except at the inner end where the stem 17 is sealed thereto. A shoulder sleeve 22 is mounted on and supported by the end of each of said stems 17 and is kept in position thereon by the terminal portion 24 of respective lead-ins 20 which extend therethrough and which is flattened laterally above the end of the sleeve to a dimension greater than the bore at the upper end of the sleeve. Said sleeves 22 are of such size and fit as to close said openings 16 against ionic or gaseous conduction between the interior and exterior of said cylinder 10. The said sleeves 22 are preferably of such material as lavite or quartz which does not dissociate with the evolution of water vapor or other gases or vapors upon atomic bombardment thereof during use of the device and serve to prevent such dissociation of the glass stems 17 over which they extend and prevent consequent evolution of deleterious gas or vaporous materials. These electrodes 24 co-operate as anodes or point electrodes with electrode 10 as cathode in a point to plate current rectifying combination. As shown in Fig. 10 a partition 26 is used in some cases to completely separate said electrodes 24 to prevent the formation of a positive column discharge therebetween. Preferably, however, the device is made with such gaseous pressure characteristics that positive column discharge will not occur between said electrodes 24 so that the partition 26 is unnecessary. In the preferred embodiment of the invention an atmosphere is provided therein of helium, neon, argon or mercury vapor. A getter of alkaline metal such as lithium, sodium or magnesium is provided in the envelop 1 to purify and to keep pure the atmosphere of the device.

In a device whose parts have dimensions comparable to those of similar ionic devices in general use on currents of similar values a device embodying the invention in the form illustrated in Figure 1, having magnesium as a getter and an atmosphere of helium at a pressure of about 10 millimeters of mercury will rectify an alternating current of a value up to about 150 milliamperes at a voltage at definite values between 80 and 250 and will regulate the rectified voltage within narrow limits, namely within ½ to 5 volts between no load and full load. A similar device with sodium as a getter and with an atmosphere of about 10 millimeters of helium or of about 6 to 7 millimeters of neon and alternating current voltages between about 180 to 260 will rectify and will control the voltage of the rectified current to keep it within narrow limits either side of about 100 volts. In the making of the device illustrated in Fig. 1 the getter is applied by placing original getter material within said cylinder 10. The interior of the tube is heated during the exhausting of the tube preliminary to filling it with its operating atmosphere by producing a glow discharge between the electrodes 6 and 10 or by placing the device within the influence of a high frequency inductive heater. The heating of the device at this stage clears the material of the electrodes and of the envelope and other parts of gases and at the same time the getter material is heated and vaporized, the metal thereof passing to and depositing itself over the interior of electrode 10 and onto the electrodes 24 and also passes through the minute openings left or provided through the wall of said electrode 10 to the space outside thereof whereby it passes to and is deposited on the exterior of said electrode 10 and onto the mesh of said electrode 6. The getter material from which the getter is distilled or vaporized is of such material as lithium, sodium or magnesium in the metal form.

I have conceived the idea that the getter can be applied in a way which is different and which will aid in the evacuation of the envelope 1 and in leaving the getter in the pure and highly reactive state in the finished device. This method is that of supplying the original getter material in the form of a compound of the final getter which compound upon being heated dissociates into the getter element and into an element or elements which are in the form of a gas which will serve to carry out from the envelope 1 other gases which are more easily combined with the getter element. As an example of material suitable and highly useful for this purpose I use sodium azide. This compound which has the formula NaN7 upon heating dissociates with a production of voluminous quantities of nitrogen gas and with a comparatively small amount of sodium azide quantities of nitrogen are produced in volume many times greater than that of the interior of the envelope. Heating for this dissociation as above described is preferably done during the pumping out of said envelope 1, the pumping being commenced before heating becomes effective. This provides that residual gas from the envelope and gas forced out of the electrodes, envelope wall and other parts by heating will be pushed out of the envelope as the nitrogen gas is evolved upon the dissociation of the sodium azide. The great volume of gas produced provides the effect of repeated rinsing of the interior of the envelope and the parts therein from other gases and that the final pumping or exhausting of the envelope will be of nitrogen gas alone. This gives the highly desired result of leaving the dissociated sodium metal in a state which is substantially pure. It further provides that there is left in the envelope 1 no gas for combination with the sodium but possibly a very small residual quantity of nitrogen. As sodium will combine with nitrogen in the portions of one atom of sodium to 7 of nitrogen and there being very little nitrogen left in the envelope the sodium is left in a very pure and highly efficient getter state. That is, the sodium is left substantially completely free to combine with gases or vapors which are evolved from the walls of the envelope and the electrodes and other parts therein during and as a result of the operation of the device and thereby provides a device of long life. The sodium azide is, in the preparation of the embodiment of the invention illustrated in Fig. 1, first supplied within said cylinder 10 and vaporized and later condensed and deposited on the parts of the device all as above described.

In Fig. 2 of the drawing the envelope 30 having a filling of a rare gas has mounted therein the closed hollow cylinder electrode 32 from which extends the connecting lead 34 which is sealed through the wall of said envelope 30. The insulating stems 36 carry the sealed-in lead-ins 38 which terminate within said cylinder electrode 32 and serve as point electrodes therefor in a point to plate rectifier combination. The lavite or silica sleeves 40 protect such part of stems 36, as may be subjected to atomic bombardment and consequent evolution of gases or vapors during use of the devices. Mounted on top of said cylinder 32 and insulated therefrom by the disc 42 and the sleeve 44 is the open top cup electrode 46. Through said sleeve or bushing 44 there projects into said cup 46 an electrical conducting extension 48 of said electrode 32. A co-operating terminal 50 connected to the interior of cup 46 terminates at a distance from said terminal 48 suitable for glow discharge therebetween. A sealed-in lead-in connector 52 is provided for said electrode 46.

In the wiring diagram included in Fig. 2 the secondary 54 of a transformer is connected across said lead-ins 38, the transformer primary 56 serving for energization of the device from a suitable source of alternating current not shown. From an intermediate point on said secondary 54 and through an inductance or choke coil 58 connection is made through said lead 34 to said electrode 32. A rectified current positive output main 60 connects to said lead 34 and a co-operating negative output main 62 connects to an intermediate point on said inductance 58. Across said mains 60 and 62 is connected a condenser 64 and said electrode 46 is connected through lead 52 and a connector 66 to said main 62 at a point between said inductance 58 and condenser 64. As above indicated the terminals of said lead-ins 38 co-operate with said electrode 32 as a point to plate current rectifying combination, and said terminals 48 and 50 function as glow discharge elements in a voltage regulating combination connected across said mains 60 and 62. The inductance 58 and the condenser 64 function to aid said electrodes 48 and 50 in controlling fluctuation in the voltage across said mains 60 and 62 to keep it within given limits of value.

In the embodiment illustrated in Fig. 3 there is positioned in the sealed envelope 70 a pair of metal boxes 72, which are closed on all sides, which are connected electrically and supported by the cross wire 74 which is in turn supported by the sealed-in conductor 76, which extends through the re-entrant seal-in tube stem 75. This pair of boxes serves the same functions as the said electrode 10 of Fig. 1 when the dividing partition 26 is used therein, as shown in Fig. 10, for preventing the formation of a positive column discharge between anodes 24 which co-operate with electrode 10 in a current rectifying combination. In the device of the present figure a sealed-in conductor 78 carried by a stem 80 mounted on said stem 75, and which extends through the bottom of each of said boxes 72 terminates within its respective box electrode 72, for co-operation therewith in a point to plate current rectifying function. Each of said stems 80 carries a protecting sleeve 82 of quartz or silica or the like about the portion thereof which is within the respective box 72 and at points where atomic bombardment is liable to cause dissociation, the respective lead-in conductor 78 terminating thereabove. About said box electrodes 72 is mounted the cylindrical electrode 84, electrical connection being provided therefor by means of the sealed-in conductor 86. As in the device of Fig. 2, the electrodes 72 which serve as cathodes in the rectifying combination and anodes in the current regulating combination connect through wire 74 and inlead 76 to a positive rectified current output main 60, and a connection is made from said lead 76 through the inductance 58 to an intermediate point on the transformer secondary 54. From an intermediate point of said inductance 58 connection is made to a negative rectified current main 62, and across said mains 60 and 62 is connected the condenser 64. Opposite outer points on said secondary 54 are each connected to one of said conductors 78, and connection is made from electrode 84 through conductor 86 to said main 62 at a point between condenser 64 and said inductance 58.

In the diagram of Fig. 4 a closed hollow electrode 90 in the envelope 92 containing an atmosphere of a rare gas or other suitable gas or vapor connects through the supporting lead 94 to the positive output main 96, and the point electrodes 98 mounted in said electrode 90 each connects to a respective outer point on the transformer secondary 54 which co-operates with the primary 56. From an intermediate point of said secondary 54 through an inductance 99 there connects the negative output main 100. Across said mains 96 and 100 is connected the condenser 102 outside said inductance 99 and from a point on said main 100 outside said condenser connection is made through wire 104 and sealed-in lead 106 to the voltage regulator cathode 108 whose terminal 110 co-operates with an adjacently spaced extension electrode 112 of said electrode 90 in their voltage regulation function. In the system diagrammatically shown in this figure suitable provision not shown in detail is provided for preventing gaseous conduction between said electrode 98 and said electrode 108 and its terminal 110, in the manner fully described above in the more detailed descriptions of the previous figures, and in this system the said transformer secondary 54 serves to co-operate with said condenser 102 to assist in the voltage regulation of the rectified current passing through said mains 96 and 100.

Fig. 5 illustrates a system similar to that of Fig. 2 except that said hollow cylinder electrode 32 has provided therein between the point electrodes 38' the partition 120 which serves to prevent the formation of a positive column discharge between said electrodes 38'. In other respects the two ionic devices and the connections therefor are similar to those of Fig. 2.

The system illustrated in Fig. 6 is similar to that of Fig. 4 except that between the connection of electrode 108 to said main 100 and the connection of said condenser 102 to said main 100 there is connected an additional condenser 122 across said mains 96 and 100 and in series with said main 100 between said condensers 102 and 122 there is connected the additional inductance 124.

In Fig. 7 there is diagrammatically illustrated an embodiment of the invention in which current conduction between the rectifier anodes and regulator cathode through the gas fillings of the devices is prevented by forming the plate electrode 130 as a partition to divide the sealed envelope 132 into two compartments 134 and 136 each of which is supplied with a gas filling such as neon, helium, argon, mercury vapor and so on. In said chamber 134 there are mounted the point electrodes 138 in co-operative relation with said electrode 130. Sealed-in leads 140 connect respective electrodes 138 to outer points on the transformer secondary 142 which co-operates with the primary 144. Connection is made from an intermediate point on said secondary 142 by means of lead 146 to the negative rectified current main 148 and a lead 150 connects said electrode 130 to the positive rectified current main 152. In series with said lead 146 is connected an inductance 154 and connection is made from each end of said inductance 154 through a respective condenser 156 and 158 to said conductor 150. An electrode 160 which co-operates with said electrode 130 in slow discharge voltage regulating function connects through lead 162 to said negative main 148.

In the diagrammatic illustration of Fig. 8 there is shown a half wave rectifying system in co-operation with a voltage regulating combination. In this figure the parts are the same as in the diagram of Fig. 7 except that one of said electrodes 138 is omitted and said lead 146 connects with an outer point of the transformer secondary 142'.

In the system of electrical distribution illustrated in connection with the ionic device of the invention illustrated in Fig. 1 said leads 20 connect to opposite outer points of the step up transformer 54 which co-operates with the transformer primary 56. From an intermediate point of said secondary 54 connection is made through the inductance 163 to the negative D. C. work circuit main 62. Said lead 8 connects to the positive D. C. work circuit main 60 and from said lead 4 a conductor 165 connects to said main 62 outside said inductance 163. Across said inductance 163 and lead 8 on the side toward the transformer is connected the condenser 166 and across lead 8 and said conductor 165 is connected the condenser 167. Said D. C. output mains 60, 62 are shown diagrammatically as being connected to a radio frequency apparatus such as a radio receiving device 170 which includes the electron tube 172 said main 60 being connected conventionally through apparatus 170 to the plate electrode 174 of said tube 172 and said main 62 connects to the filament 176 of the tube, said filament being heated by a suitable source of current not shown. The grid 178 of tube 172 connects through condenser 182 to said main 62. A resistor 184 is connected between the conventional apparatus 170 and grid 178 and the resistor 186 is connected across the filament 176 and said grid 178. In the use of the device of the invention in connection with the radio circuit shown the said device functions to rectify the alternating current stepped up by the transformer 56, and also functions to regulate the voltage of the rectified current to keep variations thereof within narrow limits such as will not be detected in radio receiving outfits in commercial and in general use. Said inductance 163 and the condensers 166 and 167 function to assist the device of the invention in smoothing out the voltage values and in maintaining them between desired limits. It is to be understood however that for some purposes and uses the device of the invention will function alone to secure suitable and desirable voltage regulations.

In a divisional application Serial No. 204,545, filed July 9, 1927, and issued as Patent No. 1,701,751, Feb. 12, 1929, claims are made to the system of electrical distribution disclosed herein.

I claim:

1. A gaseous conducting device constituting both a current rectifier and a voltage regulator, comprising a sealed envelope, a gaseous atmosphere in said envelope, a regulator cathode element, a second element to serve as anode with respect to said regulator cathode element and as a cathode for said rectifier, a rectifier anode element, and lead-ins for each of said elements sealed through said envelope.

2. A gaseous conducting device constituting both a current rectifier and a voltage regulator, comprising, a sealed envelope, a gaseous atmosphere in said envelope, a regulator cathode element, a second element to serve as anode with respect to said regulator cathode element and as a cathode for said rectifier, a plurality of rectifier anode elements, and lead-ins for each of said elements sealed through said envelope wall, said combination being characterized by the absence of any effective ionic path between the said rectifier anode elements and said regulator cathode element.

3. A gaseous conducting device constituting both a current rectifier and a voltage regulator, comprising, a sealed envelope of glass, an atmosphere comprising a purified mixture of neon and helium, a lead-in sealed into and terminating within said envelope, a regulator cathode in said envelope connected to said lead and consisting of a cylindrical element of nickel wire gauze, a second nickel element positioned within said gauze cylinder and in the form of a cylinder closed at both ends, a lead-in to said envelope and connecting to said second element, electrode elements terminating within said second cylindrical element and sealed-in leads for each of last said elements, the last said elements and their leads being insulated against electrical contact with said second element and against gaseous conduction therefrom to the first said element.

4. A gaseous conducting device constituting both a current rectifier and a voltage regulator comprising a sealed envelope of glass, an atmosphere comprising a purified mixture of neon and helium, a lead-in sealed into and terminating within said envelope, a regulator cathode in said envelope connected to said lead and consisting of a cylindrical element of nickel wire gauze, a second nickel element positioned within said gauze cylinder and in the form of a cylinder closed at both ends, a lead-in to said envelope and connecting to said second element, electrode elements terminating within said second cylindrical element and sealed-in leads for each of last said elements, the last said elements and their leads being insulated against electrical contact with said second element and against gaseous conduction therefrom to the first said element, said second element having gas passages therethrough of a size small enough to insure against gaseous conduction therethrough but large enough to allow a degree of pressure equalization between the interior and exterior of said second element.

5. A gaseous conduction device comprising a sealed envelop, means therein serving as a point in a point to plate current rectifier combination and lead-in means therefor sealed through said envelope, means in operative relation to first said means to serve as a plate for the point to plate combination and to serve as an anode for a glow discharge voltage regulator combination, a lead from second said means sealed through the envelope, means in operative relation to second said means and serving as a cathode in the glow discharge regulator combination, a lead from last said means sealed through said envelope, a gaseous atmosphere between first said element and second said element and between second said element and last said element, the first said element and the last said element being insulated against gaseous conduction between each other.

6. A vapor electric discharge device comprising a sealed envelope, a rectifier cathode dividing said envelope into two chambers, a sealed in lead-in for said rectifier cathode, rectifier anodes in one of said chambers and in operative relation to said cathode with sealed in conductors therefor, an electrode in the other of said chambers in operative relation to said rectifier cathode, a sealed-in conductor for the last said electrode, and a gasous filling for each of said chambers.

Signed at Hoboken, in the county of Hudson and State of New Jersey, this 7th day of October, A. D. 1926.

TED E. FOULKE.